No. 619,768. Patented Feb. 21, 1899.
R. LEWIS, Jr.
BICYCLE SADDLE.
(Application filed Jan. 28, 1896.)
(No Model.) 2 Sheets—Sheet 1.
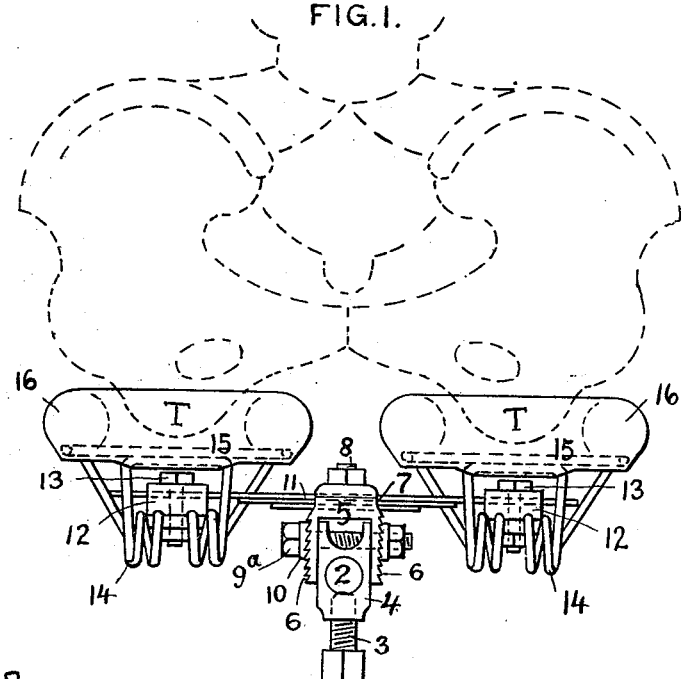
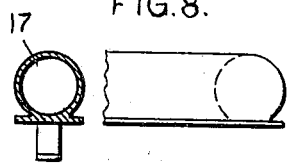
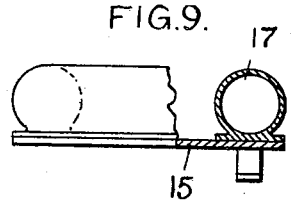
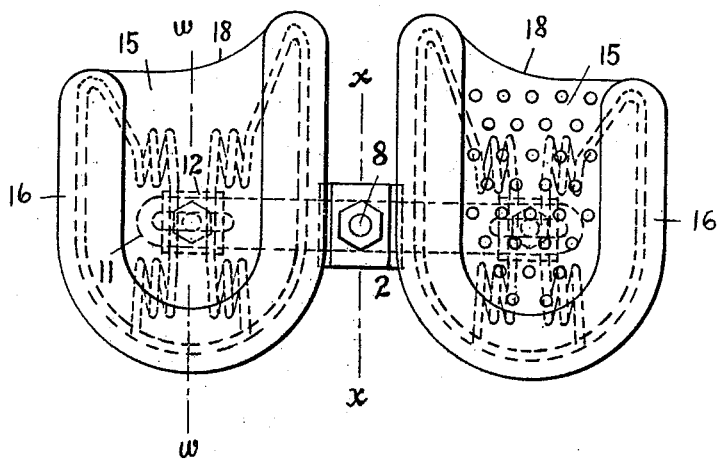
WITNESSES:
INVENTOR
Robert Lewis Jr
BY
ATTORNEY No. 619,768. Patented Feb. 21, 1899.
R. LEWIS, Jr.
BICYCLE SADDLE.
(Application filed Jan. 28, 1896.)
(No Model.) 2 Sheets—Sheet 2.
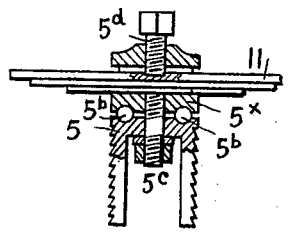
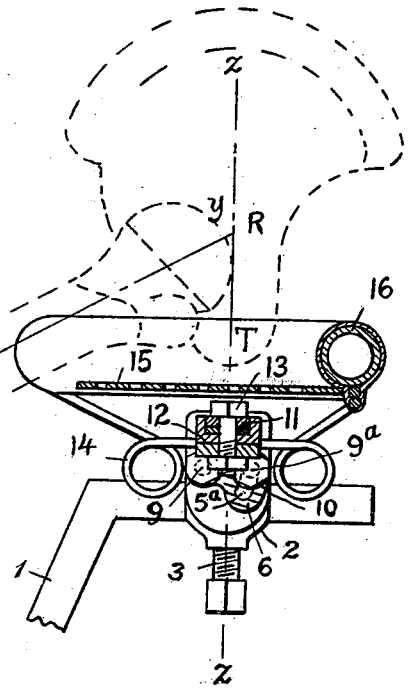
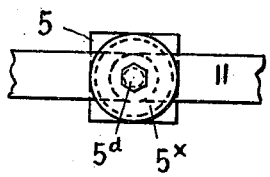
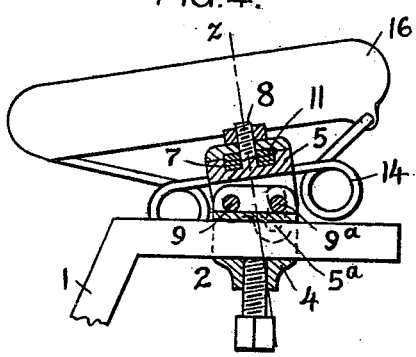
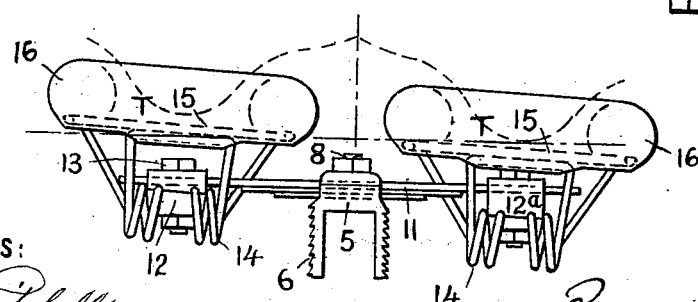
WITNESSES:
INVENTOR
Robert Lewis Jr
BY
ATTORNEY
THE NORRIS PETERS CO., PHOTO-LITHO., WASHINGTON, D. C.

UNITED STATES PATENT OFFICE.

ROBERT LEWIS, JR., OF NEW YORK, N. Y.

BICYCLE-SADDLE.

SPECIFICATION forming part of Letters Patent No. 619,768, dated February 21, 1899.

Application filed January 28, 1896. Serial No. 577,191. (No model.)

*To all whom it may concern:*

Be it known that I, ROBERT LEWIS, Jr., a citizen of the United States, residing at New York, State of New York, have invented a new and useful Improvement in Bicycle-Saddles, of which the following is a specification.

My invention relates to bicycle-saddles, and has for its object the construction of a bicycle-saddle which will support the weight of the body of the rider in the axis of the body irrespective of whether the rider is sitting upright or bending forward and which in so supporting the body will provide practically fixed points of resistance for the strains exerted by the leg-muscles of the rider in propelling the bicycle.

In bicycle-saddles as heretofore constructed the weight of the rider is carried either upon the pommel of the saddle or, in the case of tilting saddles, thrown forward through the hands upon the handle-bar. To carry the weight of the rider upon the pommel is objectionable for two reasons, first, because it is liable to produce serious physical injury, and, second, a great part of the power of the extensor muscles, or, in other words, those muscles which tend to raise the foreleg, is lost. This is due to the fact that the weight of the body is not carried in the axis of the body, but thrown forward, and that the weight of the body is not carried, as it normally is carried in sitting, upon the tuberosities of the ischium. As a consequence there are no fixed points to resist strain—that is to say, the muscles that move the femur (thigh-bone) do not operate from a fixed point, as would be the case were the weight carried upon the tuberosities of the ischium. Hence when these muscles are actuated on opposite sides of the body in propelling a bicycle they tend to sway the pelvis, and the resulting muscular strains are resisted by the soft tissues of the pelvic floor. In my improved device the tuberosities of the ischium occupy a fixed position relative to the saddle-pads and the strains of the extensor and abductor muscles are resisted from these fixed points.

Tilting saddles are objectionable for the reason that they throw the weight of the body forward and onto the handle-bars, and because as the muscles on opposite sides of the body are alternately moved the pelvis is swayed and the strains of one side transmitted to the other, which results in great physical fatigue, besides interfering with the normal action of the muscles, and hence a loss of energy.

To overcome the various objections stated, I have devised the saddle which I will now proceed to describe.

Referring to the drawings which illustrate my invention, similar letters and numerals indicate like parts.

Figure 1 is a rear view of my improved saddle and its supporting-clip, also showing in dotted lines the outlines of the bones of the pelvis. Fig. 2 is a plan view of Fig. 1. Fig. 3 is a side elevation and partial section taken on the line $w\ w$ of Fig. 2. It also shows in dotted lines a side view of the pelvis, the femur or thigh-bone, and the bones of the foreleg. Fig. 4 is a view on the line $x\ x$ of Fig. 2, showing the saddle slightly tilted forward. Fig. 5 is a view corresponding to Fig. 1, showing the saddle arranged for a rider where the tuberosities of the ischium do not occupy the same horizontal plane. Figs. 6 and 7 represent, respectively, a section and plan of a revoluble saddle-clip. Fig. 8 is a detached view of an inflatable air-cushion for the saddle-pads. Fig. 9 is a similar view showing said air-cushion attached to the supporting-floors.

Referring to the drawings, 1, Fig. 3, is the ordinary saddle-post as used on all bicycles, and 2 an adjustable saddle-clip which is secured to the saddle-post by means of the set-screw 3. The clip shown, Fig. 1, consists of the body portion 4, which is perforated to carry the saddle-post, upper pivoted part 5, which is provided with serrated sides 6, and curved slots $5^a$, which include a pivot-pin 9 in the part 4. The part 5 has an opening 7 near the top for the spring which supports the saddle-pads. 8 is a set-screw for securing the spring in position. I may make a modification of the clip, as shown in Figs. 6 and 7, where means are provided to permit of the revolution of the upper part of the clip. In this case the upper part 5 of the clip is divided into two parts 5 and $5^\times$, between which are interposed the friction-balls $5^b$, the parts being secured together by the set-screw $5^c$. In this modification the spring is held by another form of set-screw $5^d$.

The arrangement of the clip as shown in Fig. 1 permits tilting the saddle forward or backward, the parts 4 and 5 being secured together by means of the pivot-pin 9, set-screw 9ᵃ, and serrated washer or washers 10. In the clip shown in Figs. 6 and 7 the saddle as a whole may be rotated on a horizontal plane and also tilted forward or backward.

Carried by the clip is a spring 11, Figs. 1 and 5. This spring is preferably a leaf-spring made up of one, two, or more flat leaves. By this arrangement the weight of any rider may be provided for—that is, for a light rider a single spring will suffice, and for a heavy rider two or more springs. Mounted on the opposite ends of the spring 11 are the blocks 12, provided with means, such as a nut 13, for securing them to the spring. By this arrangement the distance between the saddle-pads may be altered to accommodate for a difference in pelvic width of rider.

In Fig. 5 the blocks 12 are shown of different vertical height—that is, the block 12ᵃ is deeper than the block 12. By this arrangement the axis of the spring 11 is maintained horizontal, while that of the pads forms an angle thereto. The object of this arrangement is to accommodate for vertical displacement in the tuberosities of the ischium T. This condition is one which is found very frequently, particularly in the case of young women, and which is due to curvature of the spine. Carried also in the blocks 12 are the springs 14, which are extended and curved horizontally and which carry the saddle-pads 15. These saddle-pads may be of any suitable construction.

In Fig. 2 and at the right of the drawing the floor of the pad 15 is shown as ventilated. Preferably I make the floor of the pad of perforated wood, and on this and secured in any suitable manner I mount the circumferential pad 16. Instead of making the floor of perforated wood I may make it of canvas, light cloth, or any other material. It is immaterial what it is made of—preferably, however, of some material which is porous and which is fairly strong. It will be observed that the floor does not practically have to carry any weight.

The circumferential pads may be made of leather and stuffed to form a cylindrical body, as shown, or of cloth or any other material, or I may form these pads of rubber tubes and inflate them with air, as shown at 17 in Figs. 8 and 9.

The saddle-pads 15, it will be observed, are entirely independent of each other and are curved on their front edge 18. I do not limit myself in any wise to the particular shape of this curve or of the pads as a whole. Preferably, however, the front curve should conform to the curvature of the dorsal surface or under portion of the limb. I wish it further understood that I do not limit myself in any wise to the character of spring employed to mount the pads 15. That shown at 14 I have found to answer the purpose, which is to permit a slight vertical and also oscillating horizontal motion. I wish it understood that I have not in view the employment of a spring which permits any considerable degree of motion either vertically or horizontally. The only object of the springs under the saddle-pads is to accommodate the pads to the movements of the body where the axis of the body is thrown out of a straight line—as, for instance, in rounding a curve. The spring 11, which likewise may be varied in shape, serves the purpose of deadening the shocks to which the bicycle-frame may be subjected and prevent their communication to the rider. It also permits a slight coincident or independent vertical motion of the saddle-pads, and when mounted in the clip shown in Figs. 6 and 7 permits a circular horizontal motion of the pads.

It will be observed upon referring to Fig. 1 that the body is carried upon the gluteal muscles which overlie the tuberosities of the ischium and that the tuberosities of the ischium occupy fixed points relative to the saddle-pads, as shown by the line $z\,z$ of Fig. 3. Further, that if a line $y\,y$ be drawn representing the long axis of the femur it will bisect the vertical line $z\,z$ at R. From this it will appear that the point R is the point of resistance and that the femur in moving upward and downward, as indicated by the dotted lines, has the point R as its center of motion. It will be further observed that as the leg moves downward it is not interfered with by the saddle-pad, the curvature at 18 being such as to allow the required motion of the leg without coming in contact with the saddle-pad.

Having in mind now the anatomical relations of the muscles to the pelvic and thigh bones, it will be seen that perfect freedom of action is permitted to these muscles and that the weight of the body is carried in the axis of the body. The same condition will prevail if the saddle is slightly tilted forward, as in Fig. 4. The only object of this arrangement, however, is for the purpose of allowing a rider to incline the body to decrease wind-pressure in racing. The mechanical relations between the saddle and the pelvic and the thigh bones will be still the same.

I claim as my invention—

1. A bicycle-saddle comprising a supporting-clip, a transversely-disposed horizontal spring held by said clip, and two independent saddle-pads mounted respectively on the opposite ends of said spring.

2. A bicycle-saddle comprising a supporting-clip, a transversely-disposed horizontal spring held by said clip, and two independent saddle-pads adjustably mounted on said spring.

In testimony whereof I affix my signature in the presence of two witnesses.

ROBERT LEWIS, JR.

Witnesses:
PAUL N. TURNER,
GEO. H. BENJAMIN.